United States Patent [19]

Schmidt, Jr.

[11] Patent Number: 4,489,383
[45] Date of Patent: Dec. 18, 1984

[54] CLOSED-LOOP MAGNETIC ROLL/YAW CONTROL SYSTEM FOR HIGH INCLINATION ORBIT SATELLITES

[75] Inventor: George E. Schmidt, Jr., Vincentown, N.J.

[73] Assignee: RCA Corporation, New York, N.Y.

[21] Appl. No.: 312,276

[22] Filed: Oct. 16, 1981

[51] Int. Cl.³ .......................... G06F 15/50; B64G 1/32
[52] U.S. Cl. ...................................... 364/434; 244/166
[58] Field of Search ................ 364/434; 244/164, 165, 244/166, 171, 170

[56] References Cited

U.S. PATENT DOCUMENTS 4,084,773  4/1978  Schmidt, Jr. et al. .............. 244/166
4,230,294  10/1980  Pistiner ................................. 244/170

Primary Examiner—Jerry Smith
Assistant Examiner—Mark P. Watson
Attorney, Agent, or Firm—J. S. Tripoli; R. L. Troike

[57] ABSTRACT

A closed-loop magnetic roll/yaw control system for high inclination satellites where the predominant component of the geomagnetic field lies in the orbit plane of the satellite. The system includes a torquing means that forms a magnetic dipole moment parallel to the pitch axis. The torquing means is energized to minimize roll or yaw error only in two spaced portions 1 and 3 of its orbit. Each of the portions lie between the extension of the earth's magnetic equatorial plane and a second plane normal to the orbit and passing through the magnetic poles of the earth. Portions 1 and 3 are those parts of the orbit in which the satellite is traveling toward the second plane. The torquing means is de-energized after the satellite crosses the second plane and is in either of the remaining spaced portions 2 and 4 of its orbit.

4 Claims, 7 Drawing Figures

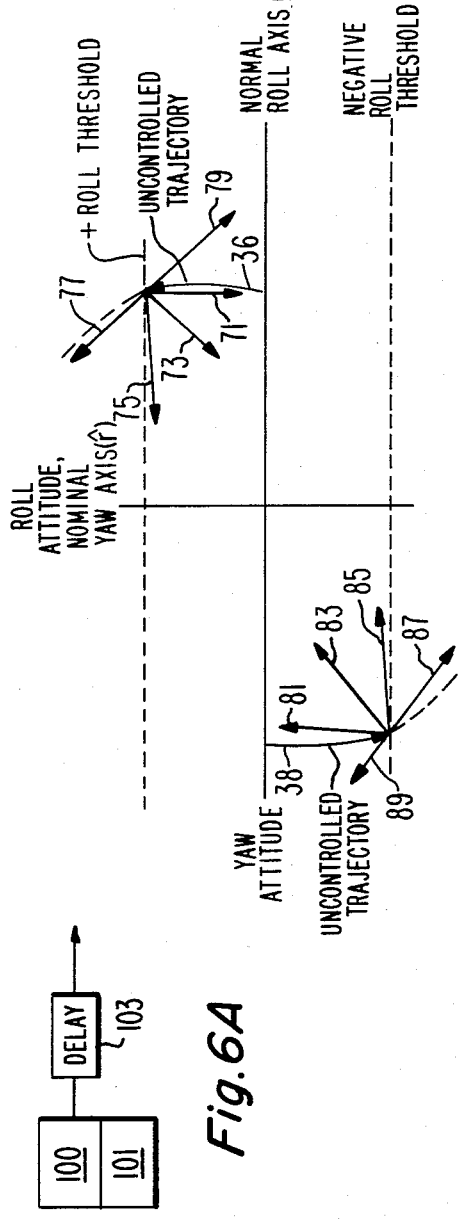
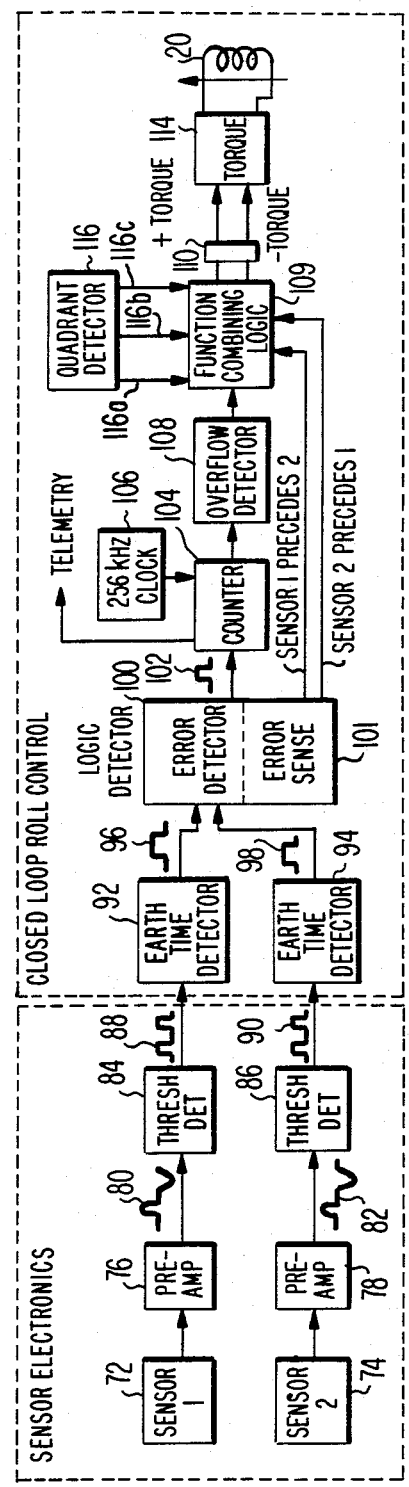

CLOSED-LOOP MAGNETIC ROLL/YAW CONTROL SYSTEM FOR HIGH INCLINATION ORBIT SATELLITES

This invention relates to control of transverse momentum and nutation of a satellite.

The invention is applicable to pitch momentum bias satellites, in high inclination orbit, of either spinning or dual-spin types and employs automatic magnetic torquing in a closed-loop control system. In this environment, the predominant component of the geomagnetic field lies in the orbit plane, namely the roll/yaw plane of the satellite. In the case of a satellite of the three axis stabilized dual-spin type, the invention provides control of the roll and yaw axes attitude as well as nutation damping control.

When a stabilized orbiting satellite deviates from its desired orientation relative to its orbit and the earth, its attitude must be corrected and similarly when the satellite undesirably nutates, such nutation must be damped. Magnetic torquing systems have been employed in the past for these purposes. Such systems generate a magnetic field from torquers such as coils or electromagnets. This field interacts with the magnetic field of the earth (the geomagnetic field) to develop a reaction torque which causes the reference axis of the satellite to be repositioned an amount proportional to the torquing time and flux magnitude.

In "open-loop" control systems, the command signals for altering the attitude of the satellite are not directly coupled to the sensors. Instead, the sensor signals are transmitted to a ground station on earth and personnel there interpret these signals and provide the appropriate timely command or control signals which are transmitted to the attitude control system of the satellite. Since satellites in high inclination earth orbits are not always in view of (radio contact with) a ground station, there often is a delay in producing the command signal and transmitting it to the satellite, and such delays sometimes make it difficult to achieve proper attitude corrections. In addition, the requirement for ground stations, and personnel there for computing attitude corrections, makes open-loop control systems of this type expensive.

"Closed-loop" magnetic attitude control systems for earth oriented, momentum bias satellites are also known in the art for both low and high inclination orbits. When, for example, an earth oriented satellite is in a near equatorial (low inclination) orbit, the predominant component of the geomagnetic field is essentially normal to the orbit plane and, as such, remains in a nearly fixed orientation, nominally parallel to the satellite pitch axis, throughout the orbit. In such cases, as described, for example, by Muhlfelder et al. in U.S. Pat. No. 4,062,509, a magnetic dipole oriented perpendicular to the satellite's pitch axis may be energized by control logic at any point in the orbit to minimize roll and yaw errors by interaction with the geomagnetic field.

The problem is complicated for near polar (high inclination) orbiting satellites since the predominant component of the geomagnetic field lies in the orbit plane, namely the nominal roll/yaw plane of the satellite, and changes orientation relative to the satellite as a function of position in orbit. For high inclination orbits, the geomagnetic field makes two complete rotations (reversal of direction) per orbit relative to the roll/yaw plane of an earth oriented satellite. The term "high inclination" orbit as used herein refers to orbits where the orbit plane is within approximately ±20 degrees of the polar plane.

One closed loop magnetic system for controlling the attitude of an earth oriented, momentum bias satellite in a high inclination orbit is described by Harold Perkel in U.S. Pat. No. 3,834,653. In accordance with the Perkel patent, the magnetic dipole is formed along the pitch axis for developing a magnetic torque along a selected axis, namely the yaw axis, of the satellite to directly control roll attitude. The magnetic torquing in the Perkel patent is restricted to relatively narrow zones about the orbit line of nodes, namely those zones within ±28 degrees of the equator, such that the local geomagnetic field is nearly parallel to the satellite roll axis and the control torque is nearly parallel to the satellite yaw axis. While this arrangement has the capability to control transverse (roll/yaw plane) body fixed disturbance torques, it is incapable of controlling or effecting inertially-fixed torques which have a component parallel to the earth's polar axis. Such disturbance torques which have a component parallel to the earth's polar axis can be the predominant environmental disturbance acting on an earth oriented satellite with a solar array oriented along the pitch axis.

Another patent by Kubo et al., U.S. Pat. No. 3,681,583, which also addresses the problem of closed loop magnetic control, teaches the commutation of a magnetic torque according to the value of a switching function S, where $S = \overline{E} \cdot (\overline{k}_B \times \overline{B})$ where $\overline{E}$ is an error vector corresponding to the difference between the vector of the satellite's angular momentum in the $\overline{k}_B$ direction and in a desired direction (the orbit normal); $\overline{k}_B$ is the vector of the direction of the satellite's attitude, a vector parallel to the pitch axis and also parallel to the dipole moment of the magnetic torquer; and $\overline{B}$ is the local geomagnetic field vector. While this scheme is suitable, it is unduly complicated since it requires a means (a magnetometer, for example) for measuring the total $\overline{B}$ vector and means for measuring both the roll and yaw attitude (to specify $\overline{E}$) of the satellite.

According to one embodiment of the present invention, a closed-loop control system for aligning the pitch axis of a momentum biased, earth oriented satellite in a high inclination orbit with the orbit normal includes a magnetic torquing means which is energized with currents of appropriate polarity and magnitude to effect the necessary torque to minimize directly both roll and yaw errors. The torquing means is oriented such that its magnetic dipole moment is on an axis which is parallel to the pitch axis. Sensor means generate signals which are proportional only to the roll error of the satellite. The sensor means output signals are passed to a threshold detector where they are compared to a torquing threshold. The magnetic torquing means is energized so as to effect the required torquing flux when the threshold is exceeded and when the satellite is in either of two spaced portions 1 and 3 of its orbit each lying generally between a first plane in which the geomagnetic equator lies and a second plane normal to the orbit plane and passing through the geomagnetic poles where the satellite is approaching the second plane. The magnetic torquing means is de-energized when the sensed attitude error becomes sufficiently small or if after the satellite crosses the second plane and until it is generally near the first plane.

In the drawing:

FIG. 5 is a diagram of the pitch axis trajectory in the local orbital roll/yaw plane under roll/yaw control for a magnetic dipole oriented along the pitch axis. The nominal pitch axis is into the page in this figure.

FIG. 6 is a block diagram of a system according to one embodiment of the present invention.

FIG. 6A illustrates a modification to the system of FIG. 6 to provide nutation damping.

Figure 1:
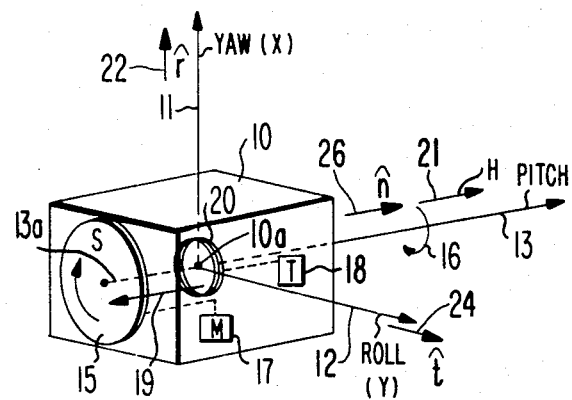
FIG. 1 is a schematic representation of a satellite showing the three axes thereof as related to the momentum and velocity vectors.

Referring to FIG. 1, there is shown a body 10 which may be a spacecraft or satellite of any suitable, desired shape. Extending from the center of mass 10a are three mutually perpendicular spacecraft axes designated as 11, 12 and 13 corresponding to the yaw, roll and pitch axes, respectively. Also shown are three local orbital reference unit vectors r̂, t̂ and n̂ designated as 22, 24, 26. Each of the three unit vectors is aligned with one of the satellite's three body axes when the satellite is in its nominal orientation relative to its orbit, where r̂(22) is the unit vector along the radius vector from the center of the earth to the satellite and aligned with the nominal yaw axis 11; n̂ (26) is the unit vector along the positive orbit normal and aligned with the nominal pitch axis 13; and t̂ (24) is the unit vector aligned with the nominal roll axis 12. For circular orbits, the unit t̂ vector is also aligned with the instantaneous satellite velocity vector. A momentum wheel 15 rotates either clockwise or counterclockwise about an axis 13a which is parallel to the pitch axis 13. This momentum wheel is driven by motor 17. The pitch axis is defined to be that direction in the spacecraft 10 colinear with the total angular momentum vector H when the spacecraft body 10 is operating in its intended mission orientation. The pitch axis is parallel to axis 13a about which the momentum wheel 15 is rotated. The sign convention is that the momentum vector 21 shown in FIG. 1 is positive in the direction of the pitch axis 13 and negative when directed opposite to the pitch axis. Thus, according to the usual convention on this art, the angular momentum possessed by the spacecraft body 10 is equivalent to having the body 10 spinning either clockwise about the pitch axis as shown along the arrow direction 16 representing the angular velocity $\omega_Z$ about the pitch axis, or counterclockwise about the pitch axis. The yaw and roll axes are mutually perpendicular and orthogonal to the pitch axis. The axis system as defined and used herein according to the usual convention is right-handed in the order of X-Y-Z. In the example of FIG. 1, the axis 13a of the wheel 15 is aligned with the pitch axis and the pitch axis 13 at times is referred to herein as the spin axis.

For the purposes of describing one embodiment of the present invention, the momentum vector H is assumed to be colinear with the pitch axis 13. Further, the pitch axis 13 is normal to the plane of the orbit of the satellite.

The practice of this invention depends on the property of a spinning satellite that it operates essentially as a gyroscope. A characteristic of such a gyroscope, in space, is that the direction of the spin axis cannot move unless deliberately torqued.

Since roll and yaw interchange sinusoidally throughout the orbit for such a spin stabilized spacecraft, the position of the spin axis is uniquely determined without the necessity of direct yaw measurement, which is difficult and costly to measure from an earth oriented or spinning spacecraft. According to the invention, the errors in roll (rotation about the roll axis) are used as a control input into the closed-loop system, as will be described.

Figure 2:
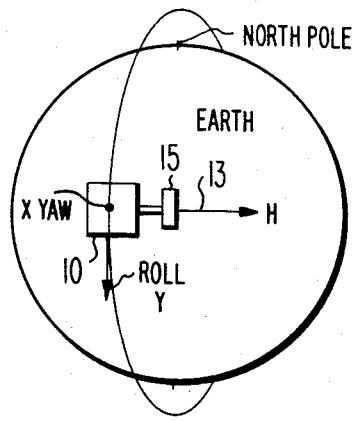
FIG. 2 is a sketch illustrating a satellite orbiting earth.

Referring to FIG. 2, there is illustrated a satellite body 10 orbiting the earth in a high inclination orbit. The satellite is oriented such that its pitch axis is perpendicular to the orbit plane, as represented by axis 13. The momentum wheel 15 is rotated at that speed at which: (1) the body portion 10 can be despun from the momentum wheel 15, and (2) can rotate one revolution per orbit so that the X (yaw) axis always points to the earth, if the orbit is circular, and the Y (roll) axis is always along the velocity vector. When operated in this way, a sensor, such as a TV camera, may be placed on the X or yaw axis so that regardless of the position in its orbit of the satellite, the sensor always can pick up information relative to earth. Similarly, an antenna located on the X axis always has a clear path to the earth and can transmit information such as that sensed by the camera, to the earth.

Figure 3:
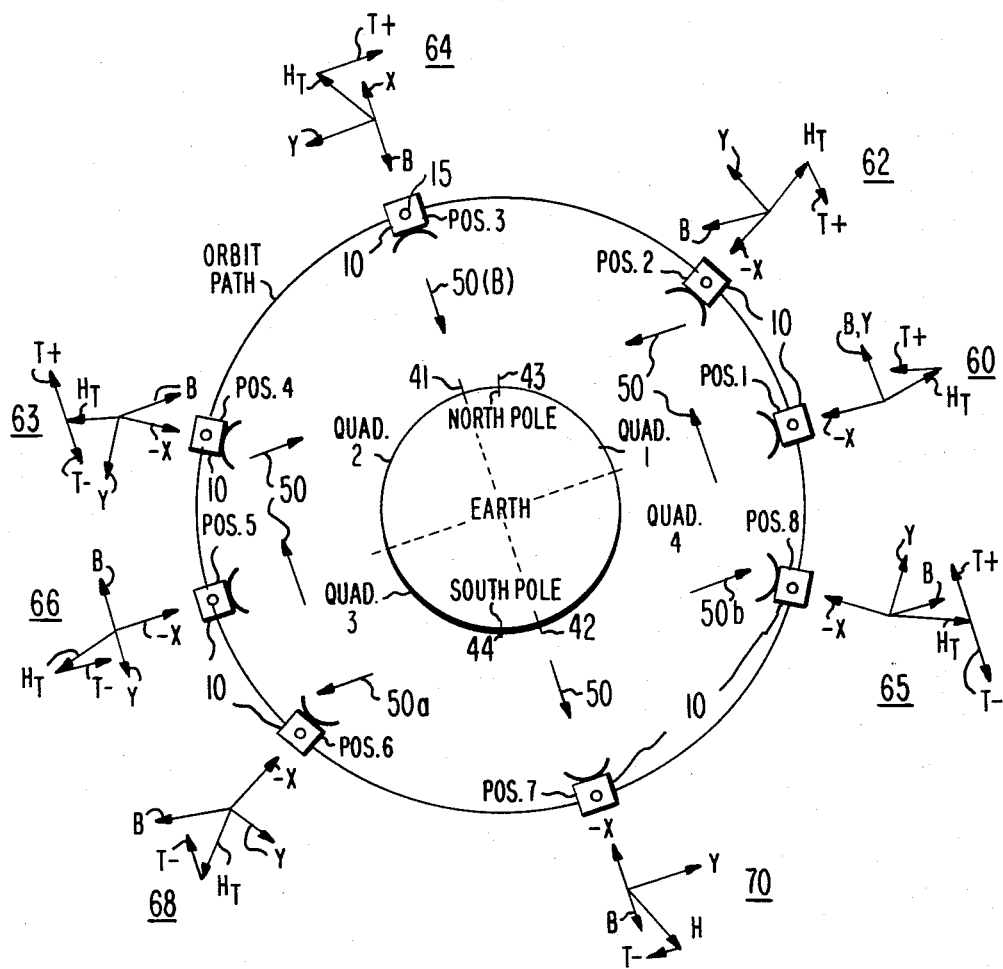
FIG. 3 is another sketch illustrating the satellite orbiting earth with the orbit plane in the plane of the page and illustrating the local geomagnetic field vector at various respective positions in the orbit.

FIG. 3 is a view of an earth oriented satellite in which the plane of the paper corresponds to the plane of the orbit of the satellite. Orbital motion is counterclockwise and therefore by the right-hand rule the positive orbit normal is pointing toward the viewer. If the momentum wheel is also rotating counterclockwise the momentum vector H is toward the viewer and in the same direction as the positive orbit normal. The arrows 50 in FIG. 3 illustrate the local geomagnetic field vector at various points about the orbit. The north and south magnetic poles 41 and 42 are offset from the north and south geographic poles, 43 and 44. As noted, the geomagnetic field vector 50 (B) points to the south from the south pole and and points in opposite east-west directions at about 30 degrees south latitude (50a and 50b). In accordance with the preferred embodiment of the present invention, the satellite body 10 includes a torquing coil 20 (FIG. 1) which generally lies in the roll/yaw plane and produces in response to a current applied to the coil from a torquing unit 18 a magnetic dipole with a dipole moment 19 parallel to the pitch axis 13 and in FIG. 3, for H (21) (FIG. 1) in a direction as coming out of the page if a positive torque is applied and into the page if a negative torque is applied. A reversal of current to the coil will produce a reversal of the control dipole moment. By applying the proper spin to the wheel 15, as mentioned previously, the yaw axis X is continuously pointed to the earth and for a circular orbit, the roll axis Y is on the velocity vector.

Figure 4:
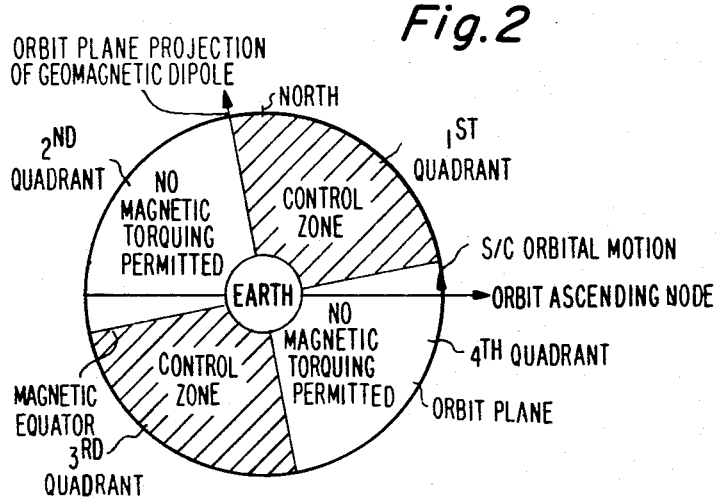
FIG. 4 is an illustration of the orbit plane showing the allowable control torquing regions of the orbit.

Referring to FIG. 4, according to the present invention, a closed-loop system, to be discussed later in connection with FIG. 6, is achieved with minimal complexities by torquing essentially in the first and third quadrants of the orbit as illustrated in FIG. 4. The quadrants are located roughly between a first plane in which the magnetic equator lies and a second plane normal to the orbit and passing through the geomagnetic poles. The first and third quadrants are those quadrants where the satellite is approaching the second plane from the direction of the first plane. The first quadrant is that quadrant where the satellite's velocity vector is generally pointing toward the north magnetic pole and third quadrant where the satellite's velocity vector is generally pointing toward the south magnetic pole. These two quadrants represent the first and third magnetic quadrants of the orbit. In accordance with the invention, during the second and fourth magnetic quadrants (where satellite's velocity vector is generally toward the magnetic equator from a pole) there is essentially no magnetic torquing carried out. It is taught herein that magnetic torquing in the above-identified second and fourth magnetic quadrants does not provide a reduction in both roll and yaw attitude errors. It is recognized that some torquing can provide a reduction in roll error though not necessarily to yaw slightly before reaching the magnetic equator in quadrants two and four, respectively, as taught by Perkel.

Referring to FIG. 5 there is shown a locus diagram of the projection satellite's momentum vector in the nominal roll/yaw (orbit) plane; i.e. the locus of disturbance induced momentum, $H_T$, transverse to the nominal pitch axis. In the absence of disturbing torques, the momentum vector is perpendicular to the nominal roll/yaw plane; therefore $H_T$ is zero, and there is no projection of the vector in that plane. As a result of environmental disturbance torques, transverse momentum develops, precessing the total momentum vector from its position normal to the nominal roll/yaw plane and thereby causing satellite roll and yaw errors. The projection of the precessed momentum vector in the nominal roll/yaw plane describes the path designated as 36 or 38 which, in the absence of control torques, is a spiral of ever increasing radius. Only small portions of possible spirals have been shown in FIG. 5.

Positive and negative roll error thresholds are shown in FIG. 5 in order to illustrate the effect on both roll and yaw error of magnetic torquing in different regions of the orbit by a dipole oriented parallel to the pitch axis. The thresholds represent the amount of positive or negative roll error (yaw component of transverse momentum) that is allowed to occur before magnetic torquing is initiated. If the satellite is at the magnetic equator (POS. 1 and POS. 5 in FIG. 3) when the positive roll threshold is exceeded, a control torque T will be generated which is directed as shown in FIG. 3 in vector diagram 60 or 66, depending upon orbit location, to precess the momentum vector along path 71 in FIG. 5. These corrections directly reduce roll attitude errors and also reduce subsequent yaw growth because of gyroscopic cross coupling. If the satellite is at an intermediate location of the first or third quadrant zones (at POS. 2 and POS. 6 in FIG. 3) when the positive roll threshold is exceeded, a control torque will be generated which is directed as shown in FIG. 3 in vector diagram 62 or 68, respectively, to precess the momentum vector along path 73 (FIG. 5). At these orbital locations, both roll and yaw attitude errors are directly reduced. Finally, if the satellite is at either the north or south magnetic pole (just leaving the first or third quadrant torquing zones POS. 3 and POS. 7 in FIG. 3) when the positive roll threshold is exceeded, a control torque will be generated which, as shown in FIG. 3, in vector diagrams 64 or 70, respectively, to precess the momentum vector along path 75 (FIG. 5). At these polar locations, yaw attitude errors, though not sensed, are directly reduced as is subsequent roll growth because of the gyroscopic cross coupling.

When the satellite is in the first and third orbital quadrants and the negative roll threshold is exceeded, the same type control phenomena will occur, with the momentum vector being precessed along path 81, (FIG. 5) if the satellite is near the magnetic equator along path 83, if the satellite is within the torquing zones and along path 85, if the satellite is near one of the magnetic poles.

According to the present invention, if the satellite is in the second or fourth quadrants of its orbit, as depicted in FIGS. 3 and 4, no magnetic control torquing is permitted since combined roll and yaw error would increase. This may also be seen by reference to FIGS. 3 and 5. If the satellite is in either the second or fourth quadrant when the positive roll threshold is exceeded (see, for example, POS. 4 and POS. 8 in FIG. 3), the control torques resulting from positive and negative control dipoles will be as shown by $T_+$ and $T_-$, respectively, in vector diagrams 63 and 65. These torques tend to increase the transverse momentum, $H_T$, and produce the divergent motion or increase combined roll and yaw error depicted by path 77 or 79 in FIG. 5. Similarly, the effect of torquing in either the second or the fourth quadrant would be to produce the divergent motion like that depicted by trajectories 87 and 89 in FIG. 5.

Magnetic torquing can also be used to provide nutation damping as explained, for example, in copending application of L. Muhlfelder et al., Ser. No. 227,343, assigned to the same assignee as the present application, filed Jan. 22, 1981, entitled, "Magnetically Torqued Nutation Damping." This same torquing can be accomplished as described therein by adding a delay before torquing which is related to the nutation period and the satellite's position in orbit. However, because the control torque changes direction throughout the orbit relative to the satellite reference, the delay must also be a function of the satellite's position in orbit. Another constraint would be that the torquing would only occur during the first and third quadrants as discussed previously.

FIG. 6 is a block diagram of one form of closed-loop control circuit, given by way of example, which may be used to implement the invention. A pair of sensors 72 and 74 suitably positioned, for example, on the momentum wheel of the satellite are oriented to respond to energy preferably in the infrared range for viewing the earth's surface during each scan (each rotation) of the momentum wheel. The outputs of the sensors are filtered to minimize noise and amplified by preamplifiers 76 and 78 developing waveforms 80 and 82 which are applied to a pair of threshold detectors 84 and 86. The output signals generated by the threshold detectors are indicated by waveforms 88 and 90. Signals 88 and 90 are applied to the earth time detectors 92 and 94 which determine the period of time that the earth is being viewed by respective sensors. Any suitable integrator or counter will serve this function. These earth-viewed time period signals are represented by the pulses 96 and 98 developed at the output of the respective detectors 92 and 94. The pulses 96 and 98 are applied to a logic detector circuit comprising an error detector 100, which develops a pulse 102 representing the error of the difference of the sensor signals 96 and 98.

The attitude sensors may be arranged in any suitable manner known in the art. Typically a pair of sensors may be arranged to view the horizon in a "V" configuration at a 45 degree angle with the local vertical such that the paths traced on the earth from horizon to horizon by the pair of sensors will be of substantially equal widths if there is no attitude error about the roll axis. A counter 104 of conventional design is arranged to measure the pulse duration of the waveform 102. Counter 104 counts the cycles of a clock 106, for example, generating clock pulses at a rate of 256 kHz which occurs during the pulse 102. The count is directly proportional to the magnitude of the misalignment of the angular momentum axis (H) with respect to the orbit normal. When the time differences are 0, or within a specified limit determined by an overflow detector 108, referred to as the threshold, the torquer is cut off or de-energized.

The overflow detector 108 is conventionally a register of a fixed number of pulses which, upon saturation, generates an output pulse as one input to logic circuit 109. When an error above threshold is determined by detector 100, counter 104, and detector 108, the torquer 114 is energized to apply current to coil 20 to effect the required torquing flux, providing the satellite is in the proper region of the earth's magnetic field as explained above. If the error is greater than a predetermined minimum, the sense of the current flowing into the electromagnetic torquer is determined by two parameters. One parameter is the sense of the error which is indicated by the error sensor 101, which determines which of the sensor outputs 96 and 98 precedes the other, to indicate the sense of the roll error. Error sensor 101 is a suitable phase detector for comparing the signals 96 and 98. The second parameter depends upon the portion of the orbit in which the error is being detected. A quadrant detector 116 determines which of the four orbit quadrants mentioned previously the satellite is n. The quadrant detector may include, for example, a counter and a clock or an ephemeris flight computer that is arranged to reset as the satellite crosses the orbit ascending node or some other known reference in orbit. A second method of determining the quadrant is to sense the earth's magnetic field by use of a magnetometer situated in the spacecraft which measures the direction and magnitude of the magnetic field of the earth relative to the spacecraft in orbit. The quadrant detector provides, for example, a first output at 116a when the satellite is in the first quadrant, a second output at 116b when the satellite is in the second and fourth quadrants, and a third output at 116c when the satellite is in the third quadrant. At the function combining logic circuit when there is an output from the quadrant detector indicating that the satellite is in the first quadrant (signal present at 116a) and an overflow occurs from overflow detector 108 which exceeds a predetermined threshold, appropriate torque signal is applied to the torquer 114 in accordance with the directional error signals sensed by error sensor 101. When the quadrant detector 116 detects that the satellite is in the second or fourth quadrants (signals at output 116b), the overflow signal from detector 108, if any, is blocked by the signals from the quadrant detector so that no torquing occurs in the second and fourth quadrant. When the quadrant detector detects that the satellite is in the third quadrant, any overflow signal exceeding a given threshold from the overflow detector 108 is supplied to the torquer. However, the sign of the torquing is reversed for the same sensed error as discussed previously so that appropriate polarity or magnetic flux is achieved. The torquing logic achieved is summarized in Table I. The torquer 114 includes a torque driver and the coil 20 or an electromagnet, as mentioned previously in connection with FIG. 1, for generating the magnetic dipole, whose direction is dependent upon whether there is a plus or minus torque condition.

Table I summarizes the dipole polarity torquing with sensed error for the four quadrants. Polarity marked 0 means no torquing. The dipole polarity is positive in the same direction as the bias momentum vector.

TABLE I

|  | Sensed Roll Attitude Polarity | Dipole Polarity |
|---|---|---|
| Quadrant 1 | + | + |
|  | − | − |
| Quadrant 2 | + | 0 |
|  | − | 0 |
| Quadrant 3 | + | − |
|  | − | + |
| Quadrant 4 | + | 0 |
|  | − | 0 |

In the case of nutation damping, a delay is introduced by delay means (see FIG. 6A) 103 to the signal 102 from the error detector 100. The delay introduced is a function of nutation frequency and position of the satellite in orbit as discussed in the previously cited copending L. Muhlfelder et al. application, Ser. No. 227,343, filed Jan. 22, 1981. As per this cited application, the delay introduced is a fraction of a nutation time period. The fraction is equal to D/360 where $D=\beta+\gamma$, where $\gamma$ is a function of the skew angle of the magnetic torque vector in degrees from the roll axis, and $\beta$ is between 130 and 180 inclusive. Obviously, the sensor and torquing may be like the horizon sensor described in Perkel, U.S. Pat. No. 3,834,653 or U.S. Pat. No. 4,062,509 of Muhlfelder et al. incorporated herein by reference. The attitude sensors may be sun sensors, star sensors, gyroscopes, etc. and the torquer may be a suitable electromagnet as is known in the art.

Although the satellite system described herein is of the dual spin type, the present attitude control system is also applicable to all momentum biased satellites including spinning satellites.

What is claimed is:

1. A closed-loop magnetic torquing system in a high inclination earth oriented orbiting pitch momentum biased satellite for automatically controlling the roll error and yaw error of the satellite and/or providing nutation damping of the satellite, to thereby orient the pitch axis to a desired attitude normal to the orbit plane, said pitch axis being colinear with the momentum vector of the satellite, said high inclination orbit being such that the geomagnetic field lies generally in the orbit plane and the positive momentum vector of the satellite is on the positive orbit normal, said system comprising:

roll error sensing means for generating a first signal representing a roll attitude deviation of the pitch axis from said desired attitude;

magnetic torquing means suitably oriented in the body of the satellite for producing, when energized, a magnetic dipole moment, which dipole moment is parallel to the pitch axis of the satellite;

means for sensing the satellite position in orbit for providing a second signal indicative of when said satellite is in either of two spaced quadrants 1 and 3 of its orbit, each lying generally between a first plane in which the magnetic equator lies, and a second plane normal to the orbit plane and passing through the geomagnetic poles, said quadrants 1 and 3 comprising parts of the orbit in which the velocity vector of said satellite is toward said second plane from the direction of said first plane, said means also providing a third signal indicative of when said satellite has crossed said second plane; and means responsive to said first, second, and third signals for energizing said magnetic torquing means solely when said satellite is in said quadrants 1 and 3 of its orbit.

2. The combination of claim 1 wherein said sensing means senses the error about the roll axis only.

3. The combination of claim 1 including means responsive to said roll error sensing means and said satellite position sensing means for energizing said magnetic torquing in one direction in response to a sensed roll error when said satellite is in said quadrant 3 where the satellite velocity vector is generally toward the south magnetic pole with respect to the torquing and responsive to the same sensed roll error for reversing the direction of magnetic torquing when said satellite is in said quadrant 1 where the satellite velocity vector is generally toward the north magnetic pole.

4. A method of automatically controlling the roll and yaw error of a momentum biased satellite in high inclination orbit to thereby orient the pitch axis to a desired attitude normal to the orbit plane, said pitch axis being colinear with the momentum vector of the satellite, using a magnetic torquing system with a torquing coil and providing a magnetic dipole along the pitch axis, said high inclination orbit being such that the geomagnetic field lies generally in the orbit plane comprising the steps of:

sensing the roll error to derive a signal representing the deviation of the pitch axis from the desired orientation;

sensing the position of the satellite in orbit; and energizing said torquing coil with current in a direction to correct the sensed error when said satellite is only in two spaced quadrants 1 and 3 of its orbit, each of said quadrants 1 and 3 lying between a first plane in which the magnetic equator lies and a second plane normal to the orbit plane and passing through the geomagnetic poles and in which said satellite is approaching said second plane from the first plane; and de-energizing said torquing coil when the sensed error has been corrected or after the satellite has crossed said second plane and is in the direction generally approaching the first plane.

* * * * *